Patented Apr. 1, 1952

2,591,539

UNITED STATES PATENT OFFICE 2,591,539

RESINOUS COMPOSITIONS

Sylvan Owen Greenlee, Racine, Wis., assignor to Devoe & Raynolds Company, Inc., Louisville, Ky., a corporation of New York No Drawing. Application October 3, 1950, Serial No. 188,269

2 Claims. (Cl. 260—45.3)

This invention relates to new resinous compositions in which epoxide resins are reacted with alkyd resins and with resinous condensates of aldehydes and ammonia derivatives, particularly urea aldehyde condensates or melamine aldehyde condensates or mixtures thereof.

The new compositions are valuable for use in varnishes and coating compositions as well as in molding compositions, adhesives, molded articles, etc.

The invention includes the method of producing complex reaction products in which the mixture of resins is heated to bring about reaction between the resins; and also includes the initial reaction mixture or compositions and the reaction products.

This application is a continuation in part of my prior application Serial No. 661,060, filed April 10, 1946.

The complex epoxides used in making the new compositions are resinous epoxides produced by the reaction of polyhydric phenols with polyfunctional halohydrins and alkali or with polyepoxides to form complex reaction products containing terminal epoxide groups.

The alkyd resins used in the new composition are condensation products made by the reaction of polybasic acids or anhydrides such as phthalic, succinic or maleic acids with polyhydric alcohols such as glycerin, sorbitol, mannitol, etc. These are combined under different conditions and usually modified in various proportions with fatty or natural resins, acids, or with drying oils.

The aldehyde-ammonia derivative condensates which are used in making the new resin compositions are condensates formed by the reaction of aldehydes and particularly formaldehyde with ammonia derivatives, including amines and amides, and more particularly with ureas and melamine to form, e. g., urea aldehyde condensates or melamine aldehyde condensates. It is known that various amines and amides will condense with aldehydes to form aldehyde-amine and aldehyde-amide condensates. Thus urea, thiourea and various substituted ureas and urea derivatives will react with aldehydes such as formaldehyde to form condensates, e. g., methylol ureas, etc. Similarly, it is well known that melamine will react with aldehydes and particularly formaldehyde to form melamine-aldehyde condensates. Various other amines and amides can similarly be reacted with formaldehyde, etc. to form condensates which are amine aldehyde or amide aldehyde resins or condensates. Thus, other amino triazines and amino diazines will similarly react with aldehydes to form condensates.

The aldehyde condensates with ammonia derivatives (amines and amides) used in making the new resinous compositions, are partial and intermediate reaction or condensation products of aldehydes, particularly formaldehyde, with amines or amides or mixtures thereof. Many of the commercial products derived from the reaction of urea or melamine with formaldehyde are mixed products made by reacting the formaldehyde with mixtures of urea and melamine; and such composite or mixed reaction products can advantageous be used in the resin compositions of the present invention.

Many of the present day commercial urea aldehyde and melamine aldehyde resins or both are prepared in the presence of alcoholic or other solvents which take part in the reaction and thus become an integral part of the resulting resin composition, as where butyl alcohol is present in the production of urea formaldehyde condensates to give butylated products. Such modified products can also advantageously be used in the new resinous compositions.

The proportions of the epoxide resins, alkyl resins and aldehyde ammonia derivative resins can be varied, but substantial amounts of all three resins will be utilized. Both the alkyd resins and the aldehyde amine or amide resins contain reactive groups which will react with the epoxide groups of the epoxide resins by direct addition reaction, without the evolution of reaction products. In general, the epoxide resins should be around 5% or more of the total resinous mixture and may be as much as 50% of the total mixture. The alkyl resins will ordinarily be used in larger proportion than the aldehyde condensate resins, e. g., from about 25% to 75% by weight of the alkyl resins and from about 10% to 25% of the aldehyde amine or aldehyde amide resin. Advantageous proportions are between around 15 and 25% of the epoxide resins, around 10 to 25% of the aldehyde amine or amide resin, and around 50 to 75% of the alkyd.

In making coating compositions the resins are advantageously dissolved in a common solvent either without or with pigments and catalysts and after the coating composition is applied the solvent is removed and the coating heated to a high temperature to bring about reaction between the resins and the formation of the hardened coating. For molding mixtures the resins can be admixed in liquid form or in solid form or in solution and either without or with catalysts such as small amounts of alkali or alkali phenylates or amines, filling and compounding materials, etc.

When the resinous composition is heated reactions take place which result in the conversion of the resinous mixture into a complex reaction product usually of an insoluble and infusible character. Included in these complex reactions are reactions between the epoxide groups of the resinous epoxides and active hydrogen of the alkyd and aldehyde amine or amine resins.

Catalysts which have been found advantageous for bringing about the reaction of the complex epoxides with the aldehyde condensates and alkyd resins are alkaline catalysts such as aliphatic amines, sodium and potassium hydroxide and alkali phenoxides. Certain of the Friedel-Crafts type catalysts are also catalytic for these reactions. Of such catalysts boron trifluoride has been found to be extremely active in promoting such reactions and in fact too active in a number of cases to be used as such. However, if a latent type catalyst which on the application of heat liberates boron trifluoride is used, the reaction may be controlled such that it gives a smooth conversion. The latent type of boron trifluoride catalysts referred to are usually coordinated compounds of boron trifluoride with amines, amides, sulfides and the like. Likewise, certain diazonium salts may be prepared which contain boron trifluoride in a form which is not active at ordinary temperatures but decompose at higher temperatures to give boron trifluoride which catalyzes the polymerization or reaction through epoxide groups.

The invention will be further illustrated by the following specific examples but it will be understood that the invention is not limited thereto.

In the following examples the epoxide resins were obtained by the reaction of bisphenol with an excess epichlorhydrin in the presence of caustic alkali.

*Example 1.*—The epoxide resin used was a complex epoxide having a melting point of 65 to 75° C. prepared by the reaction of approximately 1.57 mols of epichlorhydrin with 1 mol of bisphenol in the presence of about 1.88 mols of sodium hydroxide and with an epoxide equivalent of around 450 to 525.

The alkyd resin used was a glyceryl phthalate type of alkyd modified with monobasic saturated fatty acid (trade name Duraplex ND-77).

The aldehyde condensate resin used was a modified butyl ether of polymethylol triaminotriazine (trade name Resimene 882).

These resins were used in the proportions of 25% epoxide resin, 50% alkyd resin and 25% aldehyde condensate resin and dissolved in a solvent made of a mixture of equal weights of xylene and methylamyl ketone and a pigment was added, Rutile titanium dioxide ($TiO_2$), to form a coating composition containing 60% solids, the solids being 50% pigment and 50% resin mixture. This coating when applied and the solvent evaporated was heated for 20 minutes at 350° F. to form the hardened reaction product. The film was also hardened by heating for 1 minute at 400° F.

*Example 2.*—The alkyd resin of Example 1 was replaced by an equal weight of 47% castor oil modified glyceryl phthalate resin containing 36.4% phthalic anhydride (trade name Syntex 16). The composition otherwise corresponded to Example 1 and was similarly applied and the coating hardened by heating for 1 minute at 400° F. or 20 minutes at 350° F.

*Example 3.*—The alkyd resin of Example 1 was replaced by an equal weight of a 38% soya bean oil—cocoanut oil modified glyceryl phthalate resin containing 43.8% phthalic anhydride. The coating composition was otherwise the same as in Example 1 and was applied and hardened by baking for 10 minutes at 400° F. or 20 minutes at 350° F.

*Example 4.*—The same resins used in Example 1 were used in the same solvent, but without a pigment in the form of a solution containing 50% solids and 50% solvent. The resulting clear varnish was applied and the solvent evaporated and baked for 1 minute at 400° F. or for 20 minutes at 350° F. to give the final reaction product.

*Example 5.*—The resin mixture of Example 2 was used without a pigment and in the form of a solution containing 50% solids (50% resins and 50% solvent) and similarly applied and baked to give the final reaction product.

*Example 6.*—The resinous mixture of Example 3 was similarly used without a pigment in the form of a 50% solids solution and similarly baked to form the hardened film.

*Example 7.*—A mixture of 17.5% of the resinous epoxide of Example 1, 65% of the alkyd resin of Example 2, and 17.5% of the aldehyde condensate resin of Example 1 were used with the same pigment and solvent as in Example 1 to form an enamel composition containing 60% solids (one-half pigments and one-half resins). This composition was baked either for 20 minutes at 250° F.; for 5 minutes at 350° F. or for 1 minute at 400° F. to form the finished products.

*Example 8.*—The alkyd resin of Example 7 was replaced by a 40% dehydrated castor oil modified glyceryl phthalate resin containing 40.8% phthalic anhydride (trade name Syntex 819) and gave similar baked finishes.

*Example 9.*—The resinous mixture was made up of 15% of the epoxide resin of Example 1, 70% of the alkyd resin of Example 8, 10% of the alkyd condensate resin of Example 1 and 5% of alkyd resin which was a saturated linear polyester of average molecular weight from 2,000 to 2,500 prepared by the esterification of adipic acid and monobasic long chain fatty acids with propylene glycol (trade name Paraplex G-50). This resinous mixture was used instead of the resinous mixture of Example 1 with the same pigment and solvent to form a coating composition containing 60% solids and the resulting film was baked for 10 minutes at 300° F.

*Example 10.*—The same resins were used as in Example 9 but in the proportions of 10% epoxide resin, 65% alkyd resin, 15% aldehyde condensate resin and 10% polyester resin (Paraplex G-50) and the resulting enamel composition was baked for 10 minutes at 325° F.

*Example 11.*—The same resins were used as in Examples 9 and 10 but in the proportions of 20% epoxide resin, 65% alkyd, 10% aldehyde condensate resin and 5% polyester resin, and the resulting enamel composition was applied and baked for 10 minutes at 310° F.

*Example 12.*—The same resins were used as in Example 8 but in the proportions of 17.5% of epoxide resin, 70% of a 40% dehydrated castor oil glyceryl phthalate resin containing 41.0% phthalic anhydride and 12.5% aldehyde condensate resin, and the resulting enamel composition was baked for 10 minutes at 300° F.

*Example 13.*—The resinous mixture used was made up of 15% of the epoxide resin of Example 1, 70% of the epoxide resin of Example 8, 10% of an alcoholic type of urea formaldehyde resin resulting from the reaction of the urea formaldehyde and a monohydric alcohol (trade name Uformite F-240-N) and 5% of the polyester resin of Example 9 (Paraplex G-50). This resinous mixture in the form of a pigmented solution of similar resin, solid and solvent content to that of Example 1, was applied as an enamel and baked for 10 minutes at 300° F.

*Example 14.*—The resinous mixture was made up of 15% of the epoxide resin of Example 1, 73% of the alkyd resin of Example 8, 10% of the aldehyde condensate resin of Example 1 and 2% of the polyester resin of Example 9 (Paraplex G-50).

An enamel solution was made containing 60% solids similar to that of Example 1, with the same pigment and solvent and baked for 10 minutes either at 250° F. or at 275° F. or at 300° F.

*Example 15.*—The resinous mixture of Example 1 was replaced by a resinous mixture made up of 15% of the same epoxide resin as in Example 1, 70% of an alkyd resin which was a 38% dehydrated castor oil glyceryl phthalate resin containing 40.6% phthalic anhydride, 10% of the aldehyde condensate resin of Example 1 and 5% of the polyester resin of Example 9 (Paraplex G-50), and the resulting enamel was baked for 10 minutes at 300° F.

A modification of this resinous mixture was made in which the alkyd resin was reduced from 70 to 65% and the polyester resin increased from 5 to 10% and the resulting enamel was similarly baked for 10 minutes at 300° F.

*Example 16.*—The epoxide resin used was a complex polyepoxide resin having melting point of 55–65° C. prepared by the reaction of about 1.8 mols of epichlorhydrin with 1 mol of bisphenol in the presence of 2.16 mols of sodium hydroxide and having an epoxide equivalent of about 375 to 450.

The resinous mixture of Example 1 was replaced by a resinous mixture made up of 15% of the above epoxide resin, 70% of the alkyd resin of Example 15, 10% of the aldehyde condensate resin of Example 1 and 5% of the polyester resin of Example 9 and the resulting enamel was applied and baked for 10 minutes at 300° F.

*Example 17.*—The aldehyde condensate resin of Example 16 was replaced by the alkylated urea formaldehyde resin of Example 13 and the enamel composition was similarly applied and baked.

*Example 18.*—The epoxide resin of Example 16 was increased from 15 to 20% of the resin mixture and the alkyd resin was reduced from 70% to 65%. The resulting enamel composition was similarly applied and baked.

*Example 19.*—The same resinous mixture was used as in Example 17 but with 20% of the epoxide resin, 63% of the alkyd resin, 12% of the alkylated urea formaldehyde resin and 5% of the polyester resin (Paraplex G-50) and the resulting enamel composition was similarly applied and baked.

*Example 20.*—The resinous mixture of Example 1 was replaced by a mixture made up of 5% of the epoxide resin of Example 1, 65% of the alkyd resin of Example 8, 15% of the aldehyde condensate resin of Example 1, and 15% of a vinyl acetate modified vinyl chloride polymer (trade name Vinylite VAGH). The resulting enamel was baked for 10 minutes at 300° F.

Varying amounts of the polyvinyl resin can be used, e. g., 20% instead of 15, and with reduction, e. g., of the aldehyde condensate resin of 15 to 10%.

*Example 21.*—An enamel composition was made up containing 28.8 parts by weight of titanium oxide ($TiO_2$) and 34 parts of vehicle solids in a solvent made up of equal parts of xylene and methylamyl ketone; the vehicle solids being made up of 25% of the epoxide resin of Example 1, 50% of the alkyd resin of Example 3 and 25% of the aldehyde condensate resin of Example 1. The resulting enamel was baked for 10 minutes at 300° F.

I claim:

1. A composition containing substantial proportions of (1) an epoxide resin which is a polyether derivative of a polyhydric phenol containing epoxide groups and free from functional groups other than epoxide and hydroxyl groups, (2) a monobasic acid modified alkyd resin, and (3) a fusible condensate of an aldehyde with an organic ammonia derivative selected from the group which consists of amines and the amides and containing reactive hydrogen, the proportions being within the range of from about 5 to 50% of epoxide resin, from about 25% to 75% of alkyd resin and from about 10% to 25% of aldehyde condensate.

2. A composition containing substantial proportions of (1) an epoxide resin which is a polyether derivative of polyhydric phenol containing epoxide groups and free from functional groups other than epoxide and hydroxyl groups, (2) a monobasic acid modified alkyd resin, and (3) a fusible condensate of an aldehyde with an organic ammonia derivative selected from the group which consists of amines and amides and containing reactive hydrogen, the proportions being within the range of from about 10 to 25% of epoxide resin, from about 50% to 75% of alkyd resin, and from about 10% to 25% of aldehyde condensate.

SYLVAN OWEN GREENLEE.

No references cited.